Nov. 23, 1948.  C. E. LEBERKNIGHT ET AL  2,454,607
GLASS COMPOSITION
Filed Aug. 19, 1946
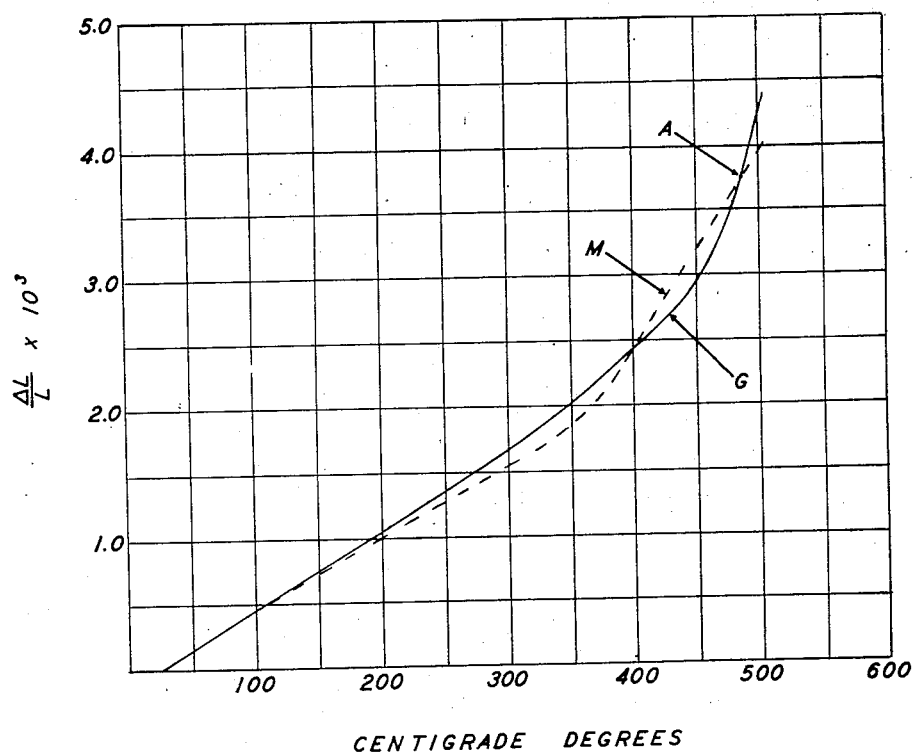
INVENTORS
Charles E. Leberknight
Eugene C. Ostrander
by William B. Wharton
their attorney

UNITED STATES PATENT OFFICE 2,454,607

GLASS COMPOSITION

Charles E. Leberknight and Eugene C. Ostrander, Edgewood, Pa., assignors to Kopp Glass, Inc., Swissvale, Pittsburgh, Pa., a corporation of Pennsylvania Application August 19, 1946, Serial No. 691,470

2 Claims. (Cl. 106—54)

This invention relates to a glass composition for glass-to-metal seals and particularly to a glass composition for making such seals with an iron-nickel alloy nominally and approximately composed of 42% nickel and 58% iron which is characterized by a sharp break in its cooling or expansion curve in the neighborhood of 400° C., and to seals so made.

In providing a glass for sealing to this specific alloy and slight variants thereof it has been desired to obtain and use for such purpose a lead-free glass, because of the tendency of a lead-containing glass to plate out against the metal in making the seal. It is, however, essential in so doing that the sealing properties and physical characteristics of the glass be suitable for forming the seal and in use of the seal when made.

It is essential in making good glass-to-metal seals that the glass and metal have the same total contraction in cooling from the setting temperature of the glass to room temperature. It is highly desirable that in cooling through that range the rate of contraction of the glass and the metal should be nearly equal at all temperatures during their cooling, and it is particularly desirable that the coefficients of expansion of the glass and metal should be approximately identical in the lower portion of the cooling range. These requirements have been met previously in lead-free glasses having a very high content of $B_2O_3$, but an undesirable characteristic attendant upon such high inclusion of $B_2O_3$ is a lack of good weathering properties.

We have discovered a glass which meets the above requirements in its expansion characteristics with respect to the expansion characteristics of the above noted iron-nickel alloy, and which has good weathering properties.

An analysis of such glass taken from the batch composition falls within the following ranges:

Table A

| | Per cent |
|---|---|
| $B_2O_3$ | 20% to 24% |
| $Al_2O_3$ | 3% to 6% |
| $TiO_2$ | 2% to 5% |
| $ZrO_2$ | .5% to 1.5% |
| $Na_2O$ | Not less than 2% of each of these alkali metal oxides |
| $K_2O$ | |
| $Li_2O$ | 7% to 12% |
| $SiO_2$ | 56% to 68% |

The foregoing ranges allow for adjustment for variation in the composition of the said 42% nickel–58% iron alloy, examples of which in some measure vary in their expansion characteristics.

As shown, the curves for the said iron-nickel alloy and glass are plotted in accordance with the standard procedure $$\frac{\Delta L}{L}$$

taken at the cooling rate of 1 centigrade degree per minute. The glass from which the curve designated G is taken, is calculated from the batch and has the approximate composition:

Table B

| | Per cent |
|---|---|
| $B_2O_3$ | 22 |
| $Al_2O_3$ | 5 |
| $TiO_2$ | 3 |
| $ZrO_2$ | 1 |
| $SiO_2$ | 58 |
| $Na_2O$ | 5 |
| $K_2O$ | 3 |
| $Li_2O$ | 3 |

It will be noted from the plotting of the curves that the total contraction of the typical example of the said iron-nickel alloy as represented by the curve M and the total contraction of the glass as denoted by the curve G are equal from the setting temperature A of approximately 480° C. down to room temperature. Also it will be noticed that throughout the entire cooling range these curves do not separate at any temperature widely enough to break the seal. At the lower temperature end of the cooling range, from about 200° C. downward, the curves are approximately coincident. Substantial equality in the expansion characteristics of the glass and metal at temperatures up to about 200° C. assures that the seal when once formed will not be broken by subsequent reasonable elevation in temperature which the seal may incur in service.

It may be noted that in the specified composition the $TiO_2$ serves not only to perform the expansion-controlling function which would be performed by an increased proportion of $B_2O_3$, but that it and the $ZrO_2$ perform a positive function in improving the weathering properties of the glass.

We claim as our invention:

1. A metal sealing glass consisting of 20% to 24% $B_2O_3$; 3% to 6% $Al_2O_3$; 2% to 5% $TiO_2$; .5% to 1.5% $ZrO_2$; the sum of $Na_2O$, $K_2O$ and $Li_2O$; 7% to 12% with not less than 2% of each of these alkali metal oxides; and 56% to 68% $SiO_2$; calculated from the batch composition.

2. A metal sealing glass consisting in approximate relative proportions of 22% $B_2O_3$; 5% $Al_2O_3$; 3% $TiO_2$; 1% $ZrO_2$; 58% $SiO_2$; 5% $Na_2O$; 3% $K_2O$; and 3% $Li_2O$; as calculated from the batch composition.

CHARLES E. LEBERKNIGHT.
EUGENE C. OSTRANDER.

REFERENCES CITED

The following references are of record in the file of this patent:

UNITED STATES PATENTS

| Number | Name | Date |
| --- | --- | --- |
| 1,394,296 | Fisher | Oct. 18, 1921 |
| 1,557,540 | Horak | Oct. 13, 1925 |